[12] United States Patent
Krapf et al.

(10) Patent No.: US 8,311,661 B2
(45) Date of Patent: Nov. 13, 2012

(54) MACHINE TOOL USE SITUATION MONITORING DEVICE USING REFLECTED SIGNAL

(75) Inventors: Reiner Krapf, Reutlingen (DE); Heiko Braun, Leinfelden-Echterdingen (DE); Michael Mahler, Leinfelden-Echterdingen (DE); Alexander Werner Hees, Bietigheim-Bissingen (DE); Robert Green, Elmhurst, IL (US)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 12/439,895

(22) PCT Filed: Aug. 31, 2007

(86) PCT No.: PCT/EP2007/059133
§ 371 (c)(1),
(2), (4) Date: Dec. 15, 2009

(87) PCT Pub. No.: WO2008/028871
PCT Pub. Date: Mar. 13, 2008

(65) Prior Publication Data
US 2010/0106284 A1 Apr. 29, 2010

(30) Foreign Application Priority Data

Sep. 4, 2006 (DE) .................. 10 2006 041 758
Aug. 22, 2007 (DE) .................. 10 2007 039 565

(51) Int. Cl.
*G06F 19/00* (2011.01)
(52) U.S. Cl. ............... 700/174; 700/177; 82/49; 83/73; 83/364

(58) Field of Classification Search ............ 700/174, 700/177; 82/49; 83/73, 364
See application file for complete search history.

(56) References Cited

U.S. PATENT DOCUMENTS

| 4,272,800 | A | * | 6/1981 | Asatourian | 362/489 |
| 5,389,939 | A | * | 2/1995 | Tang et al. | 343/754 |
| 5,436,613 | A | * | 7/1995 | Ghosh et al. | 340/573.1 |
| 6,204,754 | B1 | * | 3/2001 | Berstis | 340/435 |
| 6,660,993 | B2 | * | 12/2003 | Appleyard et al. | 250/221 |
| 7,084,779 | B2 | * | 8/2006 | Uneyama | 340/680 |
| 7,225,712 | B2 | * | 6/2007 | Gass et al. | 83/62.1 |
| 7,421,932 | B1 | * | 9/2008 | Heinzmann et al. | 83/58 |
| 7,440,620 | B1 | * | 10/2008 | Aartsen | 382/218 |
| 7,719,280 | B2 | * | 5/2010 | Lagae et al. | 324/322 |
| 7,924,164 | B1 | * | 4/2011 | Staerzl | 340/573.1 |
| 2002/0017178 | A1 | * | 2/2002 | Gass et al. | 83/58 |
| 2004/0200329 | A1 | * | 10/2004 | Sako | 83/58 |
| 2005/0057206 | A1 | * | 3/2005 | Uneyama | 318/365 |
| 2005/0073438 | A1 | * | 4/2005 | Rodgers et al. | 340/944 |
| 2005/0141997 | A1 | * | 6/2005 | Rast | 416/229 R |
| 2008/0240577 | A1 | * | 10/2008 | Aartsen | 382/218 |

FOREIGN PATENT DOCUMENTS

| CN | 1500604 | 6/2004 |
| DE | 10 261 791 | 7/2004 |
| EP | 1 061 487 | 12/2000 |
| EP | 1 422 022 | 5/2004 |
| EP | 1 514 656 | 3/2005 |
| JP | 2004160822 | 6/2004 |

* cited by examiner

*Primary Examiner* — Michael D Masinick
(74) *Attorney, Agent, or Firm* — Merchant & Gould P.C.

(57) ABSTRACT

The invention relates to a machine tool monitoring device having a detection unit for detecting an application in a machine tool. According to the invention, at least one component of the machine tool is used as a reflector for a transmitting and/or receiving signal of the detection unit.

24 Claims, 6 Drawing Sheets

MACHINE TOOL USE SITUATION MONITORING DEVICE USING REFLECTED SIGNAL

TECHNICAL FIELD

The invention is based on a machine tool monitoring device according to the generic term of claim 1.

BACKGROUND

A machine tool monitoring device for a circular saw is known from DE 102 61 791 A1. It provides a sensor unit for producing and detecting an electromagnetic signal, which is arranged close to a saw blade. The approach of a body part to the saw blade can be detected by monitoring the signal spectrum.

SUMMARY

The invention is based on a machine tool monitoring device with a detection unit for detecting an application situation at a machine tool.

It is suggested that at least one component of the machine tool serves as a reflector for a transmitting and/or receiving signal of the detection unit, whereby the monitoring of a big area of the machine tool can be achieved constructively in a simple way.

It is furthermore suggested that the machine tool monitoring device provides at least one ultra wide band radar sensor. By using ultra wide band signals a high information frequency and thereby an effective monitoring can be achieved. An 'ultra wide band radar sensor' means in this context in particular a radar sensor, with which an ultra wide band radar signal can be produced, send, received and/or evaluated. An 'ultra wide band (UWB) radar signal' means especially an electromagnetic signal, which provides a frequency spectrum with a center frequency in the frequency range of 1 GHz to 15 GHz and a frequency range of at least 500 MHz. In particular the ultra wide band radar sensor is a component of the detection unit.

Besides it is suggested that the detection unit, in particular an ultra wide band radar sensor of the detection unit, allows a position and/or speed determination, whereby a particularly high accuracy of the detection can be achieved. A 'position determination' means in particular the determination of the position of an object that is monitored by a machine tool monitoring device in relation to an active object of the machine tool, especially in relation to a machine tool preferably in operated status. Furthermore a 'speed determination' means in particular the determination of at least one movement characteristic from the group movement direction, momentary speed value and momentary acceleration value of an object that is moving in relation to an active object of the machine tool.

A high security can be achieved in this context when the position and/or speed determination I a position and/or speed determination of human or animal tissue. The detection of human and animal tissue takes in particular place by a spectral evaluation of an ultra wide band signal.

It is suggested in a preferred embodiment of the invention that the at least one component of the machine tool is an element that processes a work piece, whereby a particularly high monitoring range in the direct surrounding of an element that processes a work piece can be achieved. It is suggested in this context that the at least one component of the machine tool is a saw blade or saw band.

It is suggested in an advantageous improvement of the invention that the detection unit provides at least one antenna with a transmitting and/or receiving direction, which is pointed at the at least one component, whereby an evaluation signal with a high intensity can be achieved.

It is suggested in a further embodiment of the invention that the detection unit provides at least two sensors, which are arranged in a machine tool basic assembly position on both sides of a machine tool work surface for placing a work piece, whereby a stretching of a high monitoring range can be achieved constructively in a simple way. A '"machine tool basic assembly position"' means in this context in particular a position, which is present at the application of the machine tool by an end user under application conditions according to instructions. The machine tool work surface is preferably arranged as a contact face for placing a work piece that has to be processed, which is horizontally directed in the machine tool basic assembly position. The sensors are preferably separated by the machine tool work surface at the arrangement of the sensors on 'both sides' of the machine tool work surface, whereby a first sensor is arranged under and a second sensor above the machine tool work surface.

It is suggested in an advantageous improvement of the invention that the detection unit is provided to determine the dielectric constant of at least one medium, whereby a particularly accurate material detection can be achieved.

It is furthermore suggested that the detection unit is provided to determine the work piece thickness by the reflection of the transmitting and/or receiving signal on a work piece, whereby additional means for detecting the work piece thickness can be advantageously economized.

It is suggested for determining the dielectric constant and/or the work piece thickness that the detection unit serves in at least one operating mode for the evaluation of at least one radiation from a group of at least two radiation parts, which are spatially separated from each other due to a reflection of a signal at least two interfaces of a medium.

A particularly effective detection can be achieved when the machine tool monitoring device, especially the detection unit, provide an antenna array. An 'antenna array' means in this context in particular a group of several different antennas that are separated from each other, which are fed during operation with a signal that needs to be send by a common signal producing unit. Conveniently the antenna array provides at least one ultra wide band radar antenna.

The accuracy at the detection can be increased when the antenna array is arranged as a phase variable antenna array. A 'phase variable' antenna array means in this context in particular an antenna array, which is assigned to at least one phase displacement means, which is provided for changing at least one relative phasing between two signals, which are radiated from different antennas of the antenna array.

A high flexibility in the configuration of monitoring functions can be achieved when the detection unit determines at least two monitoring areas for monitoring an application process of the machine tool.

Besides it is suggested that the monitoring areas are each assigned to a different operating mode of the machine tool, whereby a high flexibility in the application of the machine tool can be achieved.

It is suggested in a preferred embodiment of the invention that at least one of the monitoring areas is assigned to a warning mode of the machine tool. Advantageously precautionary measures can thereby be initialized at the detection of a potentially dangerous application situation before an operator is in acute danger.

In this context an advantageous warning effect and a high security can be achieved when the detection unit—together with a machine tool driving unit for driving a machine tool—is provided for slowing down a machine tool drive in the warning mode.

It is furthermore suggested that the detection unit allows to distinguish human or animal tissue on the one hand and wood or metal or plastic on the other hand, whereby depending on the detected material type different processes can be initiated.

Advantageously the detection unit comprises an arithmetic unit, which is provided to detect the application situation by an evaluation of parameters that is based on fuzzy and/or neuronal logic. With the aid of fuzzy logic a big and complex information amount can be quickly evaluated by the arithmetic unit by the detected signal. A fuzzy logic in particular demonstrates a logic, which assigns the occurrence of a specific event to a probability value in the interval between 0 (false) and 1 (true). By a neuronal logic advantageous self learning functions of the machine tool monitoring device can be achieved.

It is suggested in an advantageous improvement of the invention that the detection unit provides a data bank, in which a set of parameters are assigned to an application situation. A particularly quick detection process of an application situation can be achieved by checking a correlation between detected parameters and an application situation.

Furthermore a procedure for detecting an application situation at an application process of a machine tool is suggested, at which at least one parameter is detected for detecting the application situation from the detection of human or animal tissue, whereby a high security can be achieved at the application of the machine tool.

BRIEF DESCRIPTION OF THE DRAWINGS

Further advantages accrue from the following drawing description. Embodiments of the invention are shown in the drawings. The invention, the description and the claims contains several characteristics in combination. The expert will also consider the characteristics separately and sum them up to further useful combinations.

It is shown in.

DETAILED DESCRIPTION

Figure 1:
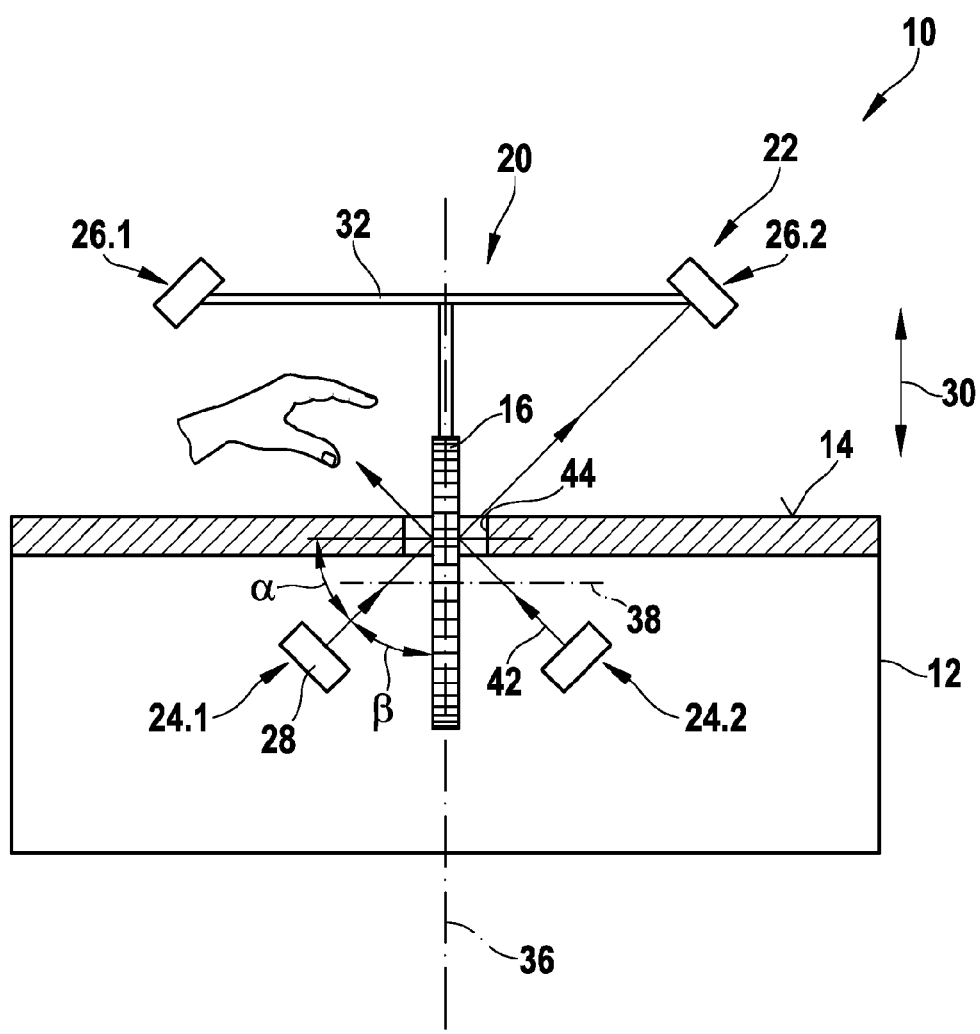
FIG. 1 is a circular saw with a saw blade and a machine tool monitoring device in a frontal section view.

FIG. 1 shows a machine tool 10 that is arranged as a circular table saw in a frontal section view. The following description relates furthermore to FIG. 2, which shows the machine tool 10 in a top view from above. The machine tool 10 provides a housing 12, a work surface 14 for placing a work piece that has to be sawn and a component 16 that is arranged as an element that has to be processed as a work piece. In particular the component 16 is arranged as a saw blade. Alternatively the component 16 can be arranged as a saw band and/or as a further tool that appears useful to the expert. The machine tool 10 is shown in FIG. 1 in its basic assembly position. For processing a work piece the work piece is hereby put on the horizontally directed work surface 14 and moved in a horizontal working direction 18 relatively to the tool 16, which is vertical to the drawing layer in FIG. 1. The machine tool 10 is furthermore provided with a machine tool monitoring device 20, which provides a detection unit 22 for detecting a situation that occurs at an application of the machine tool 10. The detection unit 22 is in particular designed to detect the presence of human and animal tissue in at least one monitoring area (see FIG. 8).

Figure 4:
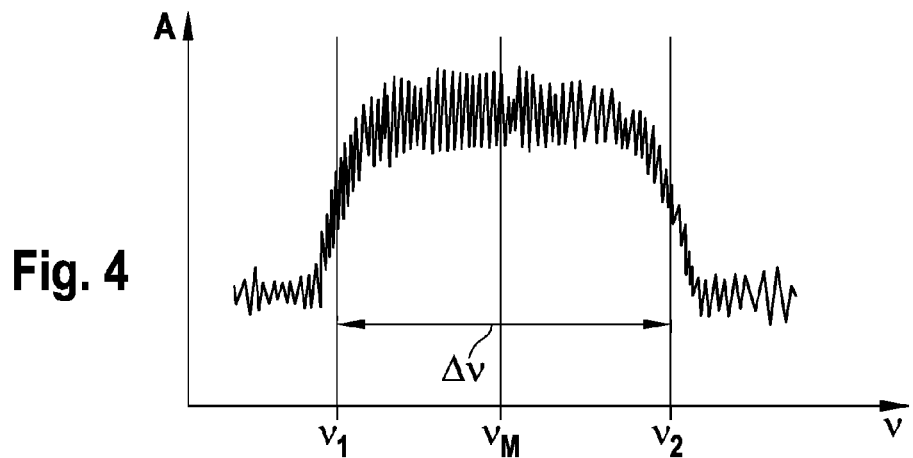
FIG. 4 is a wide band signal that is produced by the machine tool monitoring device in an amplitude frequency illustration.

The detection unit 22 is therefore provided with a number of sensors 24, 26. These sensors 24, 26 are each arranged as ultra wide band radar sensors. Therefore the sensors 24, 26 provide each at least one ultra wide band antenna 28, which is provided for sending and/or receiving an ultra wide band signal that is shown in FIG. 4. The sensors 24 are arranged in the basic assembly position of the machine tool 10 that is shown in FIG. 1 in relation to the vertical direction 30 below the work surface 14 and especially within the housing 12. The sensors 24 are hereby covered by the work surface 14 in vertical direction upwards. The sensors 26 are arranged in the basic assembly position above the work surface 14. Therefore the sensors 26 are held in its position that is above the work surface with the aid of a holding device 32. The projections of the sensors 26 in vertical direction 30 downwards on the work surface 14 are embedded in this work surface 14. The lower sensors 24 and the upper sensors 26 are arranged on both sides of the work surface 14, which means that the lower sensors 24 are separated from the upper sensors 26 by the work surface 14.

Figure 2:
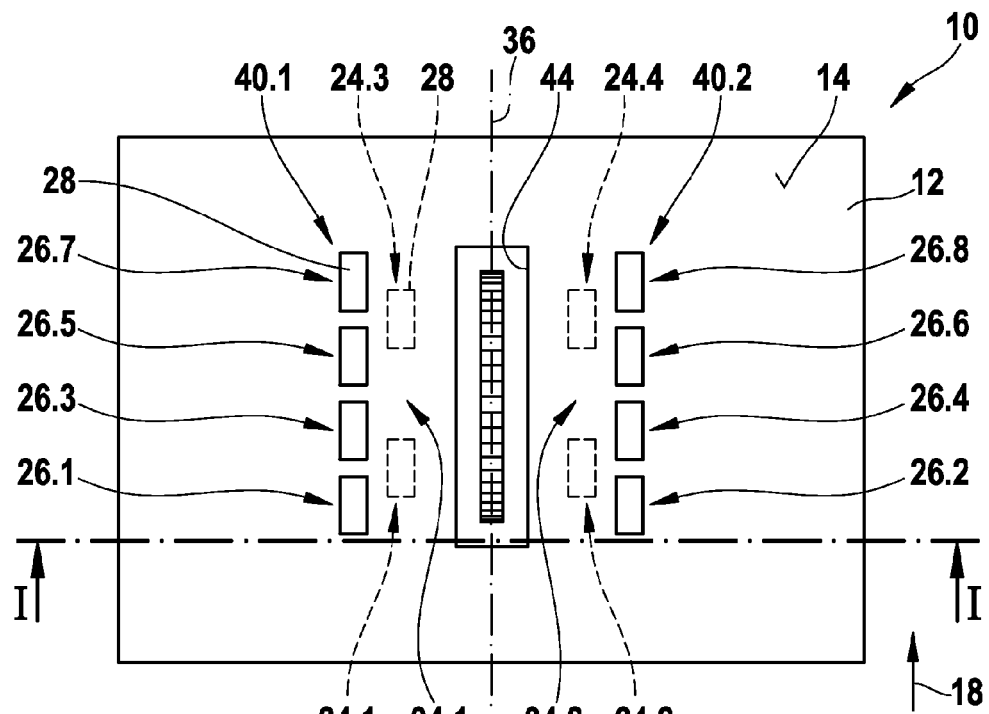
FIG. 2 shows the circular saw from FIG. 1 in a top view from above.

As it can be taken from FIG. 2, the antennas 28 of the sensors 24.1, 24.3 create a first antenna array 34.1 with two antennas 28, while the antennas 28 of the sensors 24.2, 24.4 create a second antenna array 34.2 with two antennas 28. These antenna arrays 34.1, 34.2 are arranged below the work surface 14 on both sides of a movement plane 36 of the component 16 that is arranged as a tool. The movement plane 36 corresponds in this example with the rotation plane of the component 16. This contains the focus of the component 16 and is pointed vertically to a rotation axis 38 of the component 16. The antennas 28 of the sensors 26.1, 26.3, 26.5 and 26.7 create a third antennas array 40.1 with four antennas 28, while the antennas 28 of the sensors 26.2, 26.4, 26.6 and 26.8 create a fourth antenna array 40.2 with four antennas 28. The antenna arrays 40.1, 40.2 are furthermore each arranged above the work surface 14 and on both sides of the movement plane 36. The antenna array 40.1, 40.2 are further each arranged in an area on the sides of the component 16. An arrangement 'on the sides' of the component 16 means the arrangement, in particular the complete embedding in a half space, which is limited by the movement plane 36 of the component 16. It is furthermore conceivable that even the sensors 24, 26 are arranged as antenna arrays.

The detection unit 22 provides sensors 24, 26, which are arranged in the machine tool basic assembly position, as it was described above, on both sides of the work surface 14, as for example the sensors 24.1 and 26.1. The antennas 28 provide each a transmitting and/or receiving direction 42, which is pointed at the component 16 that is arranged as a tool. This direction 42 creates hereby a sharp angle α or β with the horizontal work surface 14 with the vertically directed movement plane 36, whereby the sum of the angles α and β preferably corresponds an angle of 90°. When sending a transmitting signal by an antenna 28 the transmitting direction 42 preferably corresponds with a direction, in which the transmitting signal is radiated with the highest intensity. When receiving a receiving signal the receiving direction 42 preferably corresponds with a direction, in which the antenna 28 has the highest receiving sensitivity. The orientation of the transmitting and/or receiving direction 42 can be determined by an adjusted orientation of the corresponding antenna 28 in relation to the work surface 14, and/or an optical unit can be provided for a sensor 24, 26, which serves for bundling a radiation. The transmitting and/or receiving direction 42 can for example correspond with an optical axis of the optical unit. The antenna arrays 34, 40 are arranged as phase variable antenna arrays 34, 40 in the considered case. The relative phase position between the transmitting signals, which are created by the individual antennas that create the corresponding antenna array 34, 40 can hereby be controlled within an antenna array 34, 40. By using constructive and/or deconstructive interferences hereby a transmitting signal can be bundled for the radiation in a preferable transmitting direction 42. The controlling of the relative phase position takes place with the aid of not further illustrated phase displacement elements.

With the orientation of the transmitting and/or receiving direction 42 that is shown in FIG. 1 the component 16 that is arranged as a tool is used as a reflector for a transmitting and/or receiving signal of the detection unit 22. A transmitting signal is for example pointed by an antenna 28 under the work surface 14 from the interior of the machine tool 10 at the component 16. The transmitting signal is preferably pointed at a reflection point at the component 16, which is arranged in the area of a gap 44 in the work surface 14 that is provided for the component 16, and gets, conditioned on the tilted angle of incidence onto the component 16, into the half space above the work surface 14, in which it can be reflected or diverted at an object as for example a work piece and a hand of an operator. The transmitting signal can be for example reflected on the hand of an operator that is placed close to the component 16 and thereby pointed back at the component 16. It is received as transmitting signal by a sensor 24 and/or 26 after a new reflection at the component 16.

With the aid of the detection unit 22 different monitoring functions can be realized when processing a work piece. The construction and the functioning of the detection unit 22 are explained in FIG. 3.

Figure 3:
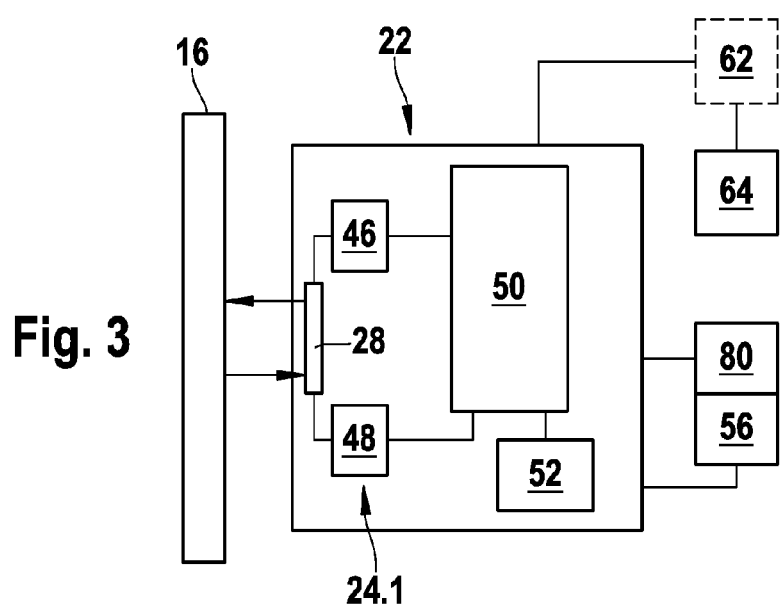
FIG. 3 shows schematically an illustration of the machine tool monitoring device.

FIG. 3 shows the machine tool monitoring device 20 with the detection unit 22 and the component 16 of the machine tool 10 that is arranged as a tool. For clarity purposes only sensor 24.1 is shown in the detection unit 22. For sending or receiving a signal the sensor 24.1 is provided with an ultra wide band antenna 28 as it is described above. The signal that has to be sent (see FIG. 4) is produced in a signal producing unit 46 of the sensor 24.1 that is provided for an ultra wide band operation and put on the antenna 28. After receiving a signal by the antenna 28 it is filtered in a signal editing unit 48, intensified, converted into a digital form and subsequently given to an arithmetic unit 50 of the detection unit 22 for processing it. The detection unit 22 provides furthermore a storage unit 52, in which a data base 54 with monitoring information is stored. This data base 54, whose function is described below, can be programmed by an end user or at a factory setting with the aid of an input unit 56. The arithmetic unit 50 preferably provides at least one microprocessor or it can be arranged as a microprocessor.

FIG. 4 shows a spectrum of a transmitting signal that is applied at the entrance of one of the antennas 28, whereby an amplitude A is registered on the ordinate and a frequency V is registered on the abscissa. The transmitting signal is transferred with a center frequency $V_M$ of 5 GHz and a signal bandwidth ΔV of 2 GHz around this center frequency $V_M$. A sub-frequency is thereby $V_1$=4 GHz and a harmonic frequency $V_2$=6 GHz. The transmitting signal can be created for example by producing pulses, whereby the pulses are each transferred with a duration of a pulse in the nanosecond range and follow one another regularly. Further creating procedures of ultra wide band signals that are useful for the specialist are conceivable.

Figure 5:
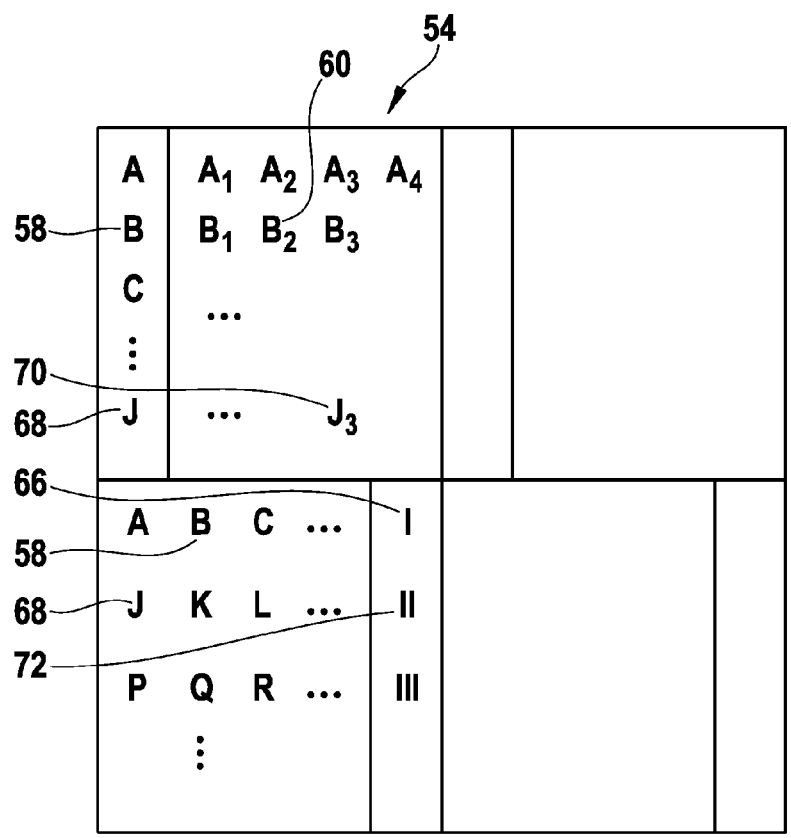
FIG. 5 is a database of the machine tool monitoring device.

FIG. 5 shows the data base 54 that is stored in the storage unit 52. With the aid of the data base 54 the arithmetic unit 50 can assign a detected receiving signal to an application situation 58, which corresponds for example with the laying down of a work piece on the work surface 14. Signal pattern, as for example $A_3$, $B_2$ and so one are assigned in the data base 54 in an assignment chart to an application situation A or B and so on. The detection unit 22 enables in particular to distinguish human or animal tissue on the one hand and wood or metal or plastic on the other hand. These different application situations distinguish themselves by a different spectrum of a received signal. These characteristic spectra, which each illustrate a signature for a specific material, are stored in the data base 54 as a signal pattern $A_1$, $B_2$ and so on. Based on the detected receiving signal the arithmetic unit 50 checks a correlation between the detected signal and the signal pattern, until a signal pattern 60 is determined, which provides the highest correlation with the detected receiving signal. The determination of the fitting signal pattern 60 is carried out with the aid of a method of the fuzzy-logic. Application situations A, B, C and so on are assigned in the data base 54 in a further assignment chart to procedures I, II, III and so on for the wok piece processing. If an application situation is detected by the detection unit 22, it can be reacted upon this application situation by modifying the course of the work piece processing by an actuator engineering unit 62 if necessary (see FIG. 3), which is provided for carrying out security measures and which is connected with the detection unit 22, according to the procedure. The actuator engineering unit 62 is hereby connected with a drive unit 64 (see FIG. 3), which is provided for driving the component 16, and/or it serves for driving of not further shown security measures, which are provided for the protection of the operator. In the considered example the application situation 58 is assigned to a procedure 66, which corresponds with the entry I in the data base 54. At this procedure 66 the operation of the machine tool 10 is for example continued unmodified.

It is furthermore assumed that a finger of the operator is approached to the driven component 16. That is reflected in the spectrum of the receiving signal and also by multiple resonance frequencies, which characterize the human tissue. This application situation is labeled as application situation 68, which is detected by the arithmetic unit 50 with the aid of the recorded receiving signal by the determination of a correlated signal pattern 70. The application situation 68 is assigned in the data base 54 to a procedure 72, in which the drive of the component 16 is switched off.

With the aid of the input unit 56 an operator can carry out a configuration of the data base 54. The operator can especially adjust the data base 54 to new applications of the machine tool 10, for example at the use of further saw means or novel equipment, and/or he can adjust new approaches, which are assigned to the specific application situations. In order to increase the data base 54 with new application situations and new procedures for these application situations a learning mode of the machine tool 10 is provided. In this mode application situations can be created by the operator purposely, whereby the arithmetic unit 50 can learn autonomously how to detect such application situations and to determine which procedures are adjusted to these application situations. The arithmetic unit 50 learns thereby to correlate these application situations with one or several signal patterns. The arithmetic unit 50 works therefore in this mode on the basis of a neuronal logic, which allows such a self-learning function.

Figure 6:
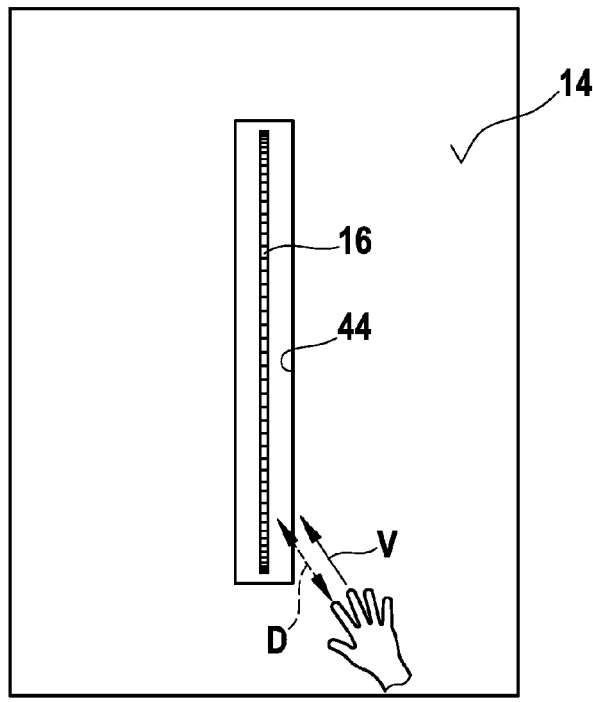
FIG. 6 shows the determination of the position and the speed of a hand in relation to the saw blade.

With the aid of the arithmetic unit 50 the position of a detected object can be furthermore determined in relation to the component 16 and especially the distance to the component 16. This is shown in FIG. 6. For determining a distance D between a detected hand and the component 16 the arithmetic unit 50 can therefore detect a duration between the creation of a transmitting signal and the receiving of the corresponding receiving signal, as for example by carrying out a phase position evaluation. By the evaluation of frequency and/or phase displacements between the transmitting signal and the receiving signal a speed V can be monitored, with which the hand is moving in relation to the component 16.

Figure 7:
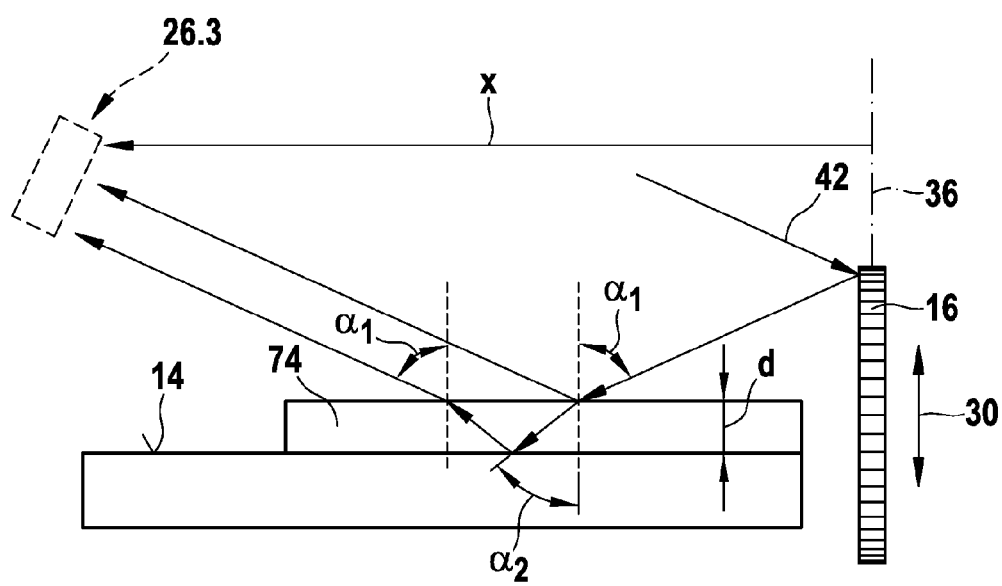
FIG. 7 shows the detection of the dielectric constant of a work piece.

The use of the component 16 that is arranged as a tool as a reflector allows furthermore the determination of the dielectric constant of a medium that is put on the work surface 14. This is schematically shown in FIG. 7. A transmitting signal is hereby pointed with the tilted sending direction 42 from one of the upper sensors 26 onto the component 16. It is assumed in the considered example that the transmitting signal is sent by one of the sensors 26.1, 26.3, 26.5, 26.7. After a reflection onto the component 16 the direction of the transmitting signal creates an angle $\alpha_1$ with a vertically pointed normal to the work piece surface in a vertical plane, which corresponds with the drawing layer. A part of the transmitting signal is reflected at a first interface between air and work piece 74, while a part is transmitted through the work piece 74. The transmitted jet creates hereby an angle $\alpha_2$ with the same normal to the work piece surface. This transmitted radiation part is reflected to the work surface 14 at a second interface of the work piece 74. The position of the sensors 26, for example the horizontal distance X of the sensor 26.3 to the moving plane 36 is chosen in such a way that only the radiation part is detected, which is reflected at the first interface. The reflection factor of the medium of the work piece 74 can thereby be determined. With the aid of the determination of the reflection factor at different polarizations of the transmitting signal the dielectric constant of the medium of the work piece 74 can be determined. This takes place with the aid of the arithmetic unit 50 of the detection unit 22. It is furthermore possible to displace the sensor 26.3 in a horizontal direction vertically to the moving plane 36 in such a way, which means to choose the distance X in such a way, that the sensor 26.3 detects the radiation part, which is reflected at the second interface. Due to the determination of the displacement distance the angle $\alpha_2$ and therefore the thickness d of the work piece 74 can be determined. This is again determined with the aid of the arithmetic unit 50 of the detection unit 22. Alternatively or additionally the use of an antenna 28 for the sensor 26.3 is possible, which provides a receiving angle that enables the detection of both radiation parts. The transmitting signal can hereby be arranged as pulsed transmitting signal, whereby it can be differentiated between the two radiation parts by a duration detection of the transmitting signal. The use of an antenna array is furthermore possible, whereby the individual antennas of the antenna array are each designed for the aimed detection of a radiation part, whereby it can be again differentiated between the two radiation parts.

Figure 8:
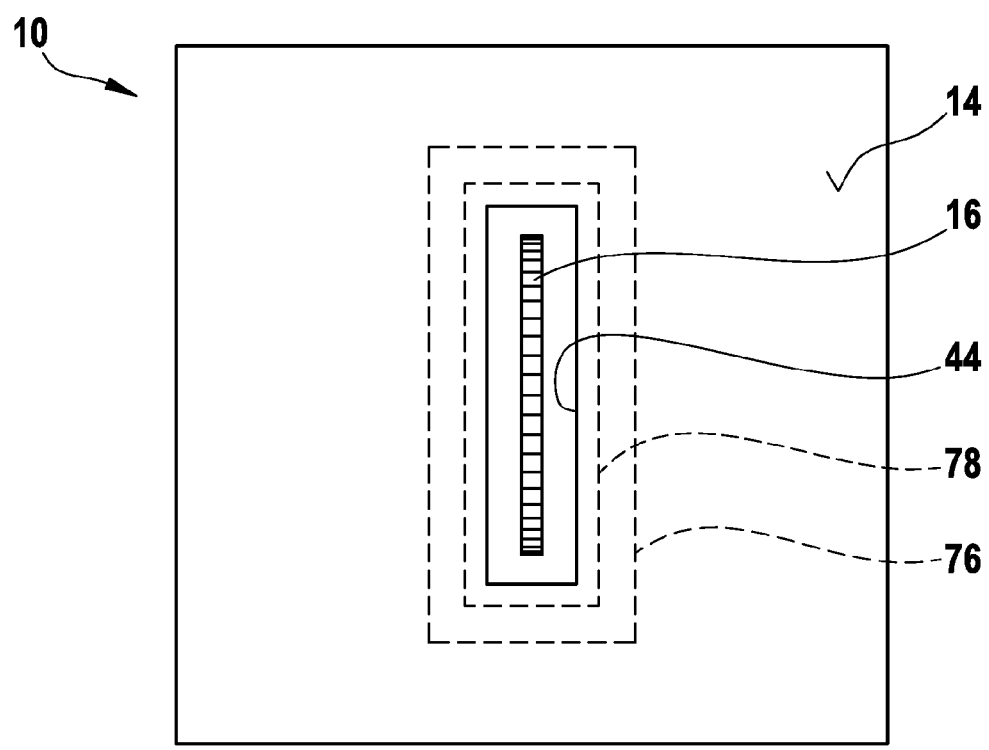
FIG. 8 shows two different monitoring areas of the machine tool monitoring device.

Due to the plurality of the antennas 28 and their distributed arrangement around the component 16 several monitoring areas of the machine tool 10 can be flexibly determined by the detection unit 22. This is shown in FIG. 8, which shows the machine tool 10 in a top view from above. The detection unit 22 determined two monitoring areas 76, 78. The projections of the monitoring areas 76, 78 in vertical direction 30 downwards on the work surface 14, which corresponds with the limits of the monitoring areas 76, 78 in the work surface 14, are shown by a dotted line. The monitoring area 78 comprises the component 16 and corresponds with the actuator engineering area. If the presence of human or animal tissue is detected by the detection unit 22 in the monitoring area 78 of a rotating component 16, a security measure of the actuator engineering unit 62 is triggered, as described above. In particular a security switch-off of the machine tool 10, especially a security switch-off of the drive unit 64, is triggered with the aid of the actuator engineering unit 62. The monitoring area 76 comprises the monitoring area 78 and is composed of points, which provide the smallest distance to the component 16, which is bigger than the smallest distance of the points of the monitoring area 78 to the component 16. The monitoring area 76 corresponds with a warning area and is assigned to a warning mode of the machine tool 10. If the presence of human or animal tissue is detected in the monitoring area 76, the operator can be warned with the aid of an optical and/or acoustic output unit 80 (see FIG. 3). A further warning mode takes place with the aid of the actuator engineering unit 62, which changes the engine speed of the rotating component 16 in connection with the drive unit 64, so that the operator is warned of the potential danger by a slowing down of the drive of the component 16. The procedures for the monitoring area 76, 78 are stored in the data base 54.

Figure 9:
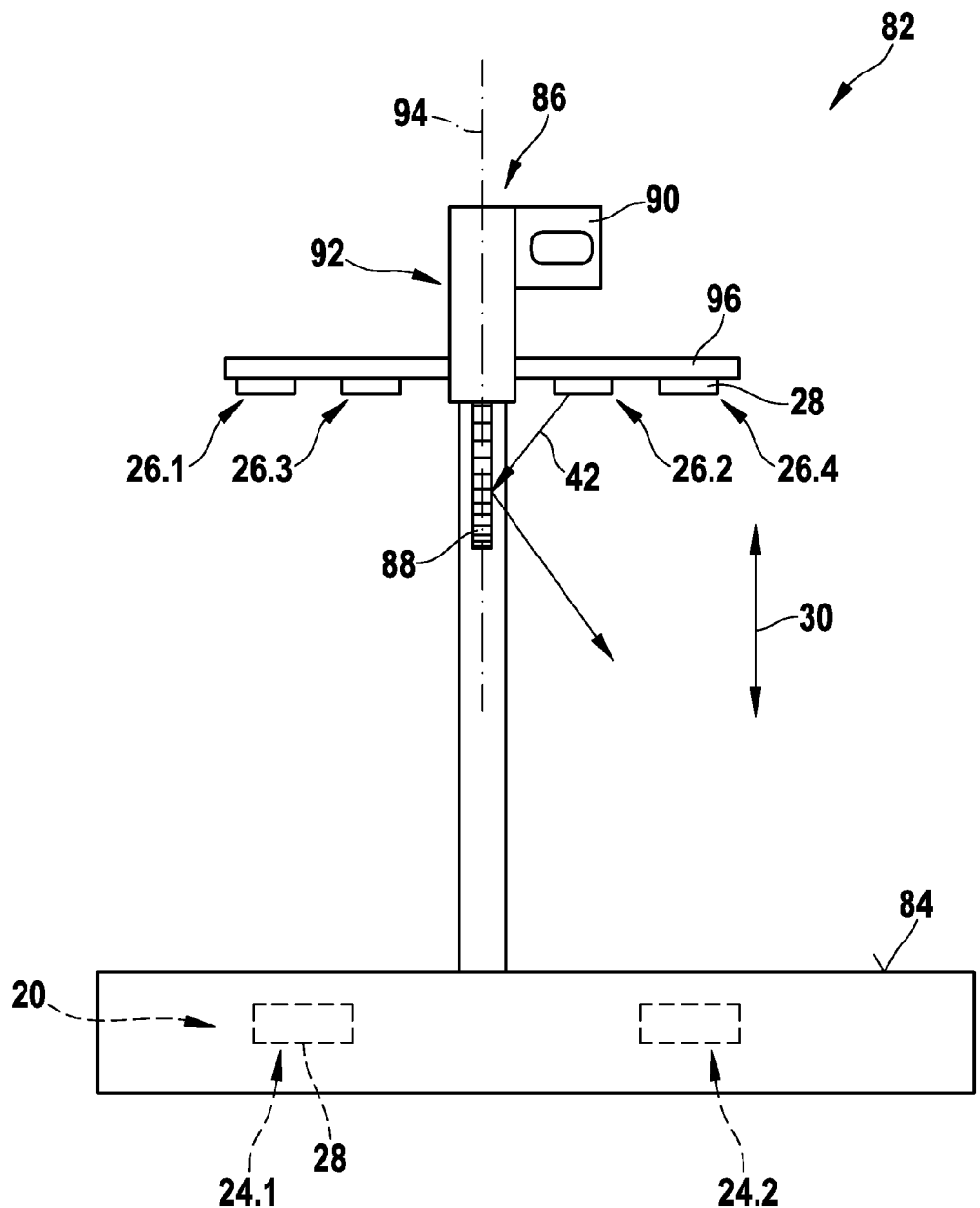
FIG. 9 is a panel saw with a machine tool monitoring device in a front view.

Advantageously the machine tool monitoring device 20 can be used at further stationary machine tools, as for example band saws, chop saws, planes and so on. It is furthermore conceivable to use the machine tool monitoring device 20 according to the invention at a chop and miter saw, a panel saw, a pit saw and so on. The use of a machine tool 82 designed as a panel saw is for example shown in FIG. 9. The machine tool 82 that is shown in FIG. 9 in a frontal view provides a work surface 84 and a tool storage unit 86 for storing a component 88 that is designed as a tool, namely a saw blade, which is stored movably relatively to the work surface 84. The tool storage unit 86 can be driven vertically downwards with the aid of an actuation unit 90 that is solid with the tool storage unit 86 until a contact of the component 88 with the work piece is created for processing a work piece that is put on the work surface 84, based on a neutral position shown in FIG. 9. The machine tool 82 provides furthermore a protection device 92 designed as a cover for a partial covering of the component 88. The machine tool 82 is furthermore provided with the machine tool monitoring device 20. This provides four sensors 24.1 to 24.4, which are arranged below the work surface 84 (see FIG. 2) and from which in the figure two sensors 24.1, 24.2 can be seen. Furthermore four sensors 26.1 to 26.4 are provided, which are arranged above the work surface 84. The above description of the machine tool monitoring device 20, in particular with regard to the arrangement of the sensors 24, 26 relatively to the work surface 84 and to a moving plane 94, in particular a rotation plane of the component 88, with regard to the orientation of the transmitting and receiving direction 42 and the use of the component 88 as a reflector for a transmitting or receiving signal is correspondingly applicable. The sensors 26 are held at a holding device 96, which is mounted solidly with the tool storage unit 86 and in particular at the protection device 92. The sensors 26 are hereby taken along at a movement of the tool storage unit 86 relatively to the work surface 14.

The invention claimed is:

1. A machine tool monitoring device, comprising:
a detection unit for detecting a use situation of a machine tool, wherein at least one portion of the machine tool is used as a deflector for a transmitting and receiving signal of the detection unit, the detection unit being positioned such that the transmitted or received signal is directed or redirected at an angle of about 90 degrees by the portion of the machine tool used as a deflector.

2. The machine tool monitoring device of claim 1, wherein the detection unit comprises at least one ultra wide band radar sensor.

3. The machine tool monitoring device of claim 1, wherein the detection unit is configured to allow a position and a speed determination.

4. The machine tool monitoring device of claim 3, wherein the position and speed determination is a position and speed determination of one of: human tissue; and animal tissue.

5. The machine tool monitoring device of claim 1, wherein the at least one portion of the machine tool is an element that processes a work piece.

6. The machine tool monitoring device of claim 5, wherein the at least one portion is a saw blade or a saw band.

7. The machine tool monitoring device of claim 1, wherein the detection unit comprises at least one antenna with a transmitting and receiving direction directed towards the at least one portion.

8. The machine tool monitoring device of claim 1, wherein the detection unit comprises at least two sensors arranged in a machine tool basic assembly position on a first and second side of a machine tool work surface for positioning a work piece.

9. The machine tool monitoring device of claim 1, wherein the detection unit is configured to determine an electrical constant of at least one medium.

10. The machine tool monitoring device of claim 1, wherein the detection unit is configured to determine a work piece thickness by a deflection of the transmitting and receiving signal on a work piece.

11. The machine tool monitoring device of claim 7, wherein the at least one antenna forms an antenna array.

12. The machine tool monitoring device of claim 11, wherein the antenna array is a phase variable antenna array.

13. The machine tool monitoring device of claim 11, wherein the antenna array comprises at least one ultra wide band radar antenna.

14. The machine tool monitoring device of claim 1, wherein the detection unit is configured to determine a plurality of monitoring areas for monitoring an application of the machine tool.

15. The machine tool monitoring device of claim 14, wherein the plurality of monitoring areas are each assigned to a different operating mode of the machine tool.

16. The machine tool monitoring device of claim 14, wherein at least one monitoring area of the plurality of monitoring areas is assigned to a warning mode of the machine tool.

17. The machine tool monitoring device of claim 16, wherein the detection unit and a machine tool monitoring device for driving the machine tool are configured to slow down a machine tool drive in the warning mode.

18. The machine tool monitoring device of claim 14, wherein at least one monitoring area of the plurality of monitoring areas is assigned to a security switch-off of the machine tool.

19. The machine tool monitoring device of claim 2, wherein the detection unit is configured to distinguish between human and animal tissue and wood or metal or plastics.

20. The machine tool monitoring device of claim 1, wherein the detection unit comprises an arithmetic unit that is configured to detect the use situation by an evaluation of one or more parameters based on one of: a fuzzy logic; and a neuronal logic.

21. The machine tool monitoring device of claim 1, wherein the detection unit further comprises a data base, wherein the data base includes a set of parameters assigned to the situation.

22. A machine tool, comprising:
a machine tool monitoring device comprising a detection unit for detecting a use situation in the machine tool, wherein at least one portion of the machine tool is used as a deflector for a transmitting and a receiving signal of the detection unit, the detection unit being positioned such that the transmitted or received signals is directed or redirected at an angle of about 90degrees by the portion of the machine tool used as a deflector.

23. The machine tool of claim 22, further comprising an ultra wide band radar sensor for detecting the use situation at an application tool.

24. A method of detecting a use situation in a machine tool, the method comprising:
a detection unit transmitting a signal;
using a portion of the machine tool as a deflector for the transmitted signal;
the detection unit receiving the deflected signal; and
detecting at least one parameter of human or animal tissue in the received signal for detecting the use situation;
wherein the detection unit is positioned such that the transmitted or received signal is directed or redirected at an angle of about 90degrees by the portion of the machine tool used as a deflector.

* * * * *